H. B. AUCHY.
CAROUSEL BEARING MECHANISM.
APPLICATION FILED NOV. 13, 1908.
988,536.
Patented Apr. 4, 1911.
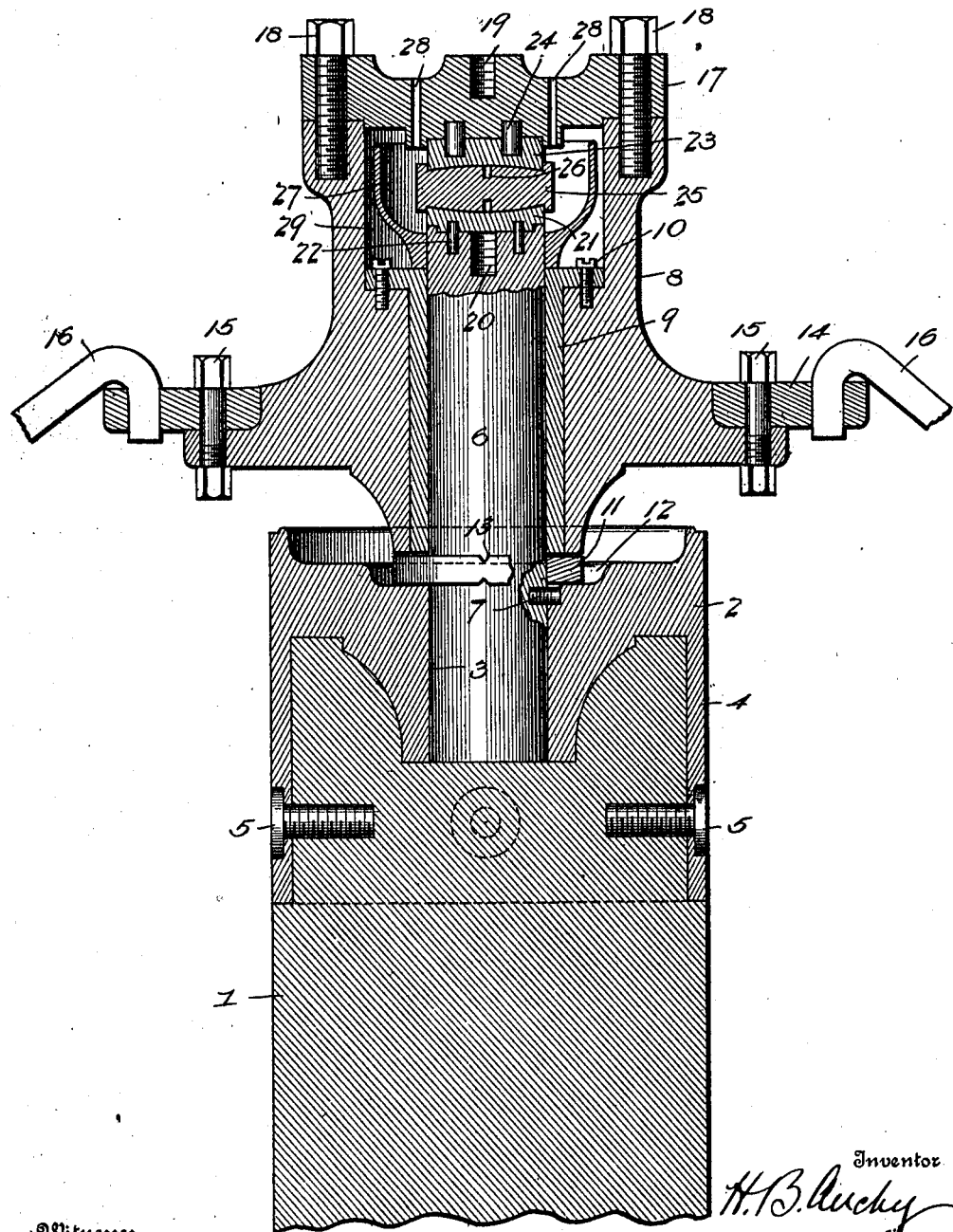

UNITED STATES PATENT OFFICE.

HENRY B. AUCHY, OF PHILADELPHIA, PENNSYLVANIA.

CAROUSEL BEARING MECHANISM.

988,536.   Specification of Letters Patent.   Patented Apr. 4, 1911.

Application filed November 13, 1908. Serial No. 462,499.

*To all whom it may concern:*

Be it known that I, HENRY B. AUCHY, a citizen of the United States, residing at Philadelphia, in the county of Philadelphia and State of Pennsylvania, have invented certain new and useful Improvements in Carousel Bearing Mechanisms; and I do hereby declare the following to be a full, clear, and exact description of the invention, such as will enable others skilled in the art to which it appertains to make and use the same.

My invention relates to step-boxes or cap-bearings for carousels and similar mechanisms. Its object is to provide a step-box or cap-bearing in which a supplemental bearing shall relieve the main bearing in case the main bearing is worn or removed, and in which the parts shall be so related as to minimize friction in action and permit the elements to be readily assembled or separated.

In the accompanying drawing the figure is, in general, a central vertical section.

1 represents the usual carousel pole which is generally a heavy wooden pole planted in the ground and forming a support for all the parts of the revolving carousel. The head of the carousel pole is cut away to receive a pole-cap 2, generally made of cast iron and comprising in addition to a bored central part 3 fitted into an opening in the carousel pole, a ring body 4 secured to the carousel pole by lag-screws 5. The guide-shaft 6 for the bearings, preferably made of steel, is supported in the bore of the pole-cap and is held from turning by means of a pin or pins 7 passing through the central part 3 of the pole-cap and into the side of the guide-shaft. A carrying-head 8, preferably of cast iron, surrounds the guide shaft 6 and is separated therefrom by a sleeve 9 secured by set screws 10 to the carrying-head. The carrying-head 8 and the sleeve 9 may, upon occasion as hereinafter shown, bear upon a bronze ring 11 which rests in a basin 12 formed in the top of the pole-cap 2 and has oil channels 13 to receive oil from a source hereinafter described and keep constantly supplied the bearing surfaces between the carrying-head and the sleeve and the ring and the pole-cap and the ring. 14 is a ring, preferably of steel, fitted about the carrying-head and secured thereto by a series of machine bolts 15 and bearing hook or swing-rods 16 which carry the carousel arms or other similar parts or weights in the usual manner.

17 represents a detachable cap-plate for the carrying-head 8 secured to the enlarged top of the carrying-head by means of screws 18.

At 19 I have provided a threaded hole to receive an eye-bolt for raising and removing the cap when the screws 18 are removed. There is also a similar threaded hole 20 in the top of the guide-shaft 6 to remove it upon occasion, as when it is desired to repair the bearings or remove the pole or its associated parts.

Upon the top of the guide shaft 6 is a bearing disk 21, of steel. The disk 21 is partly fitted into the top of the guide shaft and is secured thereto, as, for example, by means of pins 22. A similar steel disk 23 is fitted into the detachable cap-plate 17 and is secured thereto by pins 24. I have shown the steel disks 21 and 23 as slightly concaved with the concaved sides opposed when the parts are assembled. Between the steel disks and cut to fit the surface of the steel disks and to embrace each one of the disks on the sides is a bronze disk 25 having oil channels 26. The oil for lubrication is supplied to an oil cup 27 through oil channels 28 in the detachable cap-plate 17. The oil cup lies within a recess or chamber 29 formed by the carrying-head 8 and the detachable cap-plate and their parts so that the chamber forms an overflow chamber for the oil.

The oil cup 27 is kept full of oil and in fact overflows so that the oil may ooze around under it and down between the guide shaft 6 and the sleeve 9 until it reaches the bronze ring 11 when it flows along collecting in the top oil channel 13 and overflowing on the side into the cup 12 and reaching the under surface of the ring and its oil channel. The top of the cup is filled with waste to take up any superfluous oil. The ring 11 encircles the guide-shaft 6. It is an emergency bearing and only comes into use in case the cap-plate and the guide shaft are removed when it supports the parts, or in case the bearing disks, 21, 23 and 25 should so wear as to let down the carrying-head 8 until it rests and bears upon the ring 11. In such case it would be desirable to take apart the device and put in new bearing disks at the top but this provision of the emergency ring bearing 11 will enable the apparatus to run for some time without stopping for such repairs. So too, in case of any irregularity or undue wear in any part of one or more of the upper disks the ring 11 will prevent too great a distortion and will support the device and permit it to turn without undue friction.

The preceding description has shown how readily the parts may be assembled or segregated, and the especial provision for preventing any undue friction or any strain or distortion occasioned by wear of the bearing parts.

Having fully described my invention, what I claim is:—

1. In a step-box or cap-bearing for carousels and similar mechanisms, the combination with a pole, guide-shaft and carrying-head of a removable main bearing and a supplemental bearing normally supported to provide a clearance between it and the carrying-head.

2. In a step-box or cap-bearing for carousels and similar mechanisms, the combination with a pole and guide-shaft, of a carrying-head bearing upon the guide-shaft, a main-bearing upon the top of the guide-shaft from which the carrying-head is suspended, and a supplemental bearing between the bottom of the carrying-head and the top of the pole.

3. In a step-box or cap-bearing for carousels and similar mechanisms, the combination of a pole, a guide-shaft, a carrying-head journaled upon the guide-shaft, a cap-plate upon the carrying-head, a bearing between the top of the guide-shaft and the bottom of the cap-plate comprising a pair of disks, and an interposed steel disk, and a supplemental ring forming a bearing between the carrying-head and the pole and normally out of contact with the carrying-head.

4. In a step-box or cap-bearing for carousels and similar mechanisms, the combination of a pole, a guide-shaft, a carrying-head journaled upon the guide-shaft, a sleeve interposed between the carrying-head and the guide-shaft, an oil-cup resting upon the top of the sleeve, a bearing located above the guide-shaft and within the oil-cup, and a supplemental bearing located at the bottom of the sleeve and between the carrying-head and the pole.

In testimony whereof I affix my signature, in presence of two witnesses.

HENRY B. AUCHY.

Witnesses:
  CHESTER E. ALBRIGHT, Jr.,
  A. M. GODSHALL.

---

Copies of this patent may be obtained for five cents each, by addressing the "Commissioner of Patents, Washington, D. C."